United States Patent
Bordes et al.

(10) Patent No.: US 9,655,475 B2
(45) Date of Patent: May 23, 2017

(54) TOOL FOR CUTTING FOOD INTO PIECES

(75) Inventors: Jean-Luc Bordes, Ade (FR);
Jean-Michel Noguez, Lourdes (FR);
Lionel Peyras, Lourdes (FR)

(73) Assignee: SEB S.A., Ecully (FR)

( * ) Notice: Subject to any disclaimer, the term of this patent is extended or adjusted under 35 U.S.C. 154(b) by 649 days.

(21) Appl. No.: 14/122,941

(22) PCT Filed: May 30, 2012

(86) PCT No.: PCT/EP2012/060191
§ 371 (c)(1),
(2), (4) Date: Feb. 21, 2014

(87) PCT Pub. No.: WO2012/163989
PCT Pub. Date: Dec. 6, 2012

(65) Prior Publication Data
US 2014/0158800 A1   Jun. 12, 2014

(30) Foreign Application Priority Data
Jun. 1, 2011 (FR) ..................... 11 54847

(51) Int. Cl.
*A47J 43/25* (2006.01)
*B26D 1/00* (2006.01)
(Continued)

(52) U.S. Cl.
CPC ............. *A47J 43/25* (2013.01); *A47J 43/255* (2013.01); *B26D 1/0006* (2013.01); *B26D 3/22* (2013.01);
(Continued)

(58) Field of Classification Search
CPC .......... A47J 43/25; A47J 43/255; A47J 43/07; B26D 1/0006; B26D 3/22; B26D 3/36; B26D 3/43
(Continued)

(56) References Cited

U.S. PATENT DOCUMENTS 1,936,180 A   11/1933  Trainor et al.
2,596,604 A * 5/1952  Schaeffer ................. B26D 1/43
                                                192/46
(Continued)

FOREIGN PATENT DOCUMENTS

BE        701603        1/1968
DE       9017306        4/1992
(Continued)

*Primary Examiner* — Faye Francis
(74) *Attorney, Agent, or Firm* — The Webb Law Firm (57) ABSTRACT

Provided is a tool for cutting food into pieces, that includes at least one cutting element adjacent to a bearing surface. The cutting element has at least one vertical member forming a longitudinal cutting member provided for slicing the food to be cut longways, and a transverse wall having, on either side of the vertical member, two transverse cutting members provided for separating the food pieces that were sliced longways, so as to provide two channels for cut food. The vertical member has a front notch. A retaining member, which is rigidly connected to the bearing surface, can be inserted into the front notch. Also provided is an accessory for preparing food and to an appliance for preparing food having the above-described tool for cutting food into pieces.

15 Claims, 4 Drawing Sheets

(51) Int. Cl.
    *B26D 3/22* (2006.01)
    *B26D 1/36* (2006.01)
    *B26D 1/43* (2006.01)
(52) U.S. Cl.
    CPC .................. *B26D 1/36* (2013.01); *B26D 1/43* (2013.01); *B26D 2001/006* (2013.01)
(58) Field of Classification Search
    USPC ................................................ 241/93, 169.1
    See application file for complete search history.

(56) References Cited

U.S. PATENT DOCUMENTS

| | | | | |
|---|---|---|---|---|
| 4,386,740 A * | 6/1983 | Van Deursen | ........ | A47J 43/255 241/285.2 |
| 4,856,718 A * | 8/1989 | Gaber | ..................... | A47J 43/07 241/169.1 |
| 4,884,755 A * | 12/1989 | Hedrington | ........... | A47J 43/255 241/169.1 |
| 5,680,997 A * | 10/1997 | Hedrington | ........... | A47J 43/255 241/169.1 |
| 5,836,528 A * | 11/1998 | Hilgarth | ................ | B02C 18/144 144/172 |
| 6,766,731 B1 | 7/2004 | Lavi et al. | | |
| 8,579,852 B2 * | 11/2013 | Memar | ................ | A61B 17/322 241/169.1 |
| 2013/0206886 A1 * | 8/2013 | Rouyer | ................. | A47J 43/255 241/220 |
| 2013/0263716 A1 * | 10/2013 | Rouyer | ................. | A47J 43/255 83/651 |

FOREIGN PATENT DOCUMENTS

| | | |
|---|---|---|
| DE | 202009001755 | 4/2009 |
| DE | 202010002865 | 7/2010 |
| GB | 1132667 | 11/1968 |

* cited by examiner

TOOL FOR CUTTING FOOD INTO PIECES

CROSS-REFERENCE TO RELATED APPLICATIONS

This application is the United States national phase of International Application No. PCT/EP2012/060191 filed May 30, 2012, and claims priority to France Patent Application No. 1154847 filed Jun. 1, 2011, the disclosures of which are hereby incorporated in their entirety by reference.

BACKGROUND OF THE INVENTION

Field of the Invention

This invention concerns the technical area of cutting food into pieces.

This invention concerns, in particular, cutting food into sticks or slices for French fries or julienned vegetables.

This invention relates to tools for cutting food into pieces, to accessories for preparing food designed to cut food into pieces and to food preparation devices to cut food into pieces.

One purpose of this invention is to provide a cutting tool of the aforementioned type which is robust but compact.

Another purpose of this invention is to provide a food preparation accessory with a cutting tool of the aforementioned type which is robust but compact.

Another purpose of this invention is to provide a food preparation device with a cutting tool of the aforementioned type which is robust but compact.

SUMMARY OF THE INVENTION

These purposes are achieved with a tool for cutting food into pieces with at least one cutting element adjacent to a support surface which provides for movement of the food item to be cut relative to the cutting element, where the cutting element contains a transverse wall which extends along a support surface, the cutting element includes at least one mount projecting from the transverse wall, where said mount forms a longitudinal cutting body designed to split the food to be cut, where the transverse wall includes on either side of said mount two transverse cutting bodies designed to detach the pieces of split food, where said mount includes two passages for cut food with the transverse wall and the support surface, where due to the fact that said mount has a frontal notch, the longitudinal cutting body is located between the transverse wall and the frontal notch and a retention body is attached to the support surface engaged with the frontal notch. This allows the distance between the support surface and the transverse cutting bodies to be better maintained. The risk of deformation and/or rising of the cutting element because of a hard food item is significantly reduced or even eliminated.

The shape of the passages for cut food is more easily retained without requiring cutting elements which are particularly rigid and/or sharp.

In accordance with one advantageous embodiment, the retention body forms part a support element which makes up at least a portion of the support surface.

During cutting, therefore, the food item may slide along the support surface up to the mount. This reduces the length of the mount between the frontal notch and the transverse wall, thereby increasing mount rigidity. In an alternative, the support element could, in particular, be mounted on a wall of the tool for cutting food into pieces opposite the support surface.

In accordance with one advantageous embodiment, the cutting element is attached to a tool body. In an alternative, the cutting element could, in particular, extend from a tool body or be mounted, in a removable manner, to a tool body.

The cutting element may then be attached to the tool body with rivets. In an alternative, the tool body could, in particular, be milled onto the cutting element.

In accordance with one advantageous embodiment, the retention body is attached to the tool body. In an alternative, the retention body could, in particular, extend from a tool body, or even be mounted in a removable fashion to a tool body attached to the partner cutting element.

The retention body may then be attached to the tool body with rivets.

In an alternative, the tool body could, in particular, be milled onto the retention body.

The tool body could advantageously form at least a portion of the support surface. This would reduce the size of the cutting element and/or the retention body.

The tool body could advantageously be made of plastic. This would allow great flexibility in the shape of the tool body.

In accordance with one form of completion, the tool for cutting food into pieces contains a rotation element. The tool for cutting food into pieces then can be cylindrical, in the shape of a truncated cone, or in the shape of disk. In an alternative, the tool for cutting food into pieces could include a translation drive mechanism, as part of an electric slicer, or even lack a drive mechanism, as part of a slicer.

The rotation element could advantageously be part of the tool body. This would simplify completion of the tool for cutting food into pieces.

The tool for cutting food into pieces could advantageously be in the shape of a truncated cone or cylindrical wall surrounding a bottom wall with a rotation element. The cutting element would then be located outside the truncated cone or cylindrical wall. In this configuration, the transverse cutting bodies have a curved trajectory and exert a pull on the food to be cut. A particularly hard or resistant food item could then force the transverse cutting bodies to rise. The retention body engaged in the frontal notch housed in the mount offsets the rising force of the food item. The cutting element's rigidity is increased. A particularly robust cutting tool in the shape of a truncated cone or in a cylindrical shape could then be designed.

The cutting element could advantageously include at least two mounts, each with a frontal notch, with the retention body engaged with the frontal notches. Therefore, the same retention body could be used for at least two mounts. This would simplify the implementation of the cutting tool while improving its strength.

These purposes can also be achieved with a food preparation accessory designed to cut food into pieces which includes a storage compartment housing a tool for cutting food into pieces with at least one cutting element with at least two passages for cut food adjacent to a support surface, where the storage compartment has a food insertion opening which leads to the support surface and an cut food exit linked to the passages for cut food, where the tool for cutting food into pieces has at least one of the aforementioned characteristics.

These purposes can also be achieved with a food preparation device designed to cut food into pieces which includes a storage compartment housing a tool for cutting food into pieces with at least one cutting element with at least two passages for cut food adjacent to a support surface, where the storage compartment has a food insertion opening which leads to the support surface and a cut food exit linked to the passages for cut food, where the device with a drive mechanism designed to move the tool for cutting food into pieces so that the cutting element sweeps the food insertion opening, if desired using a drive mechanism, where the tool for cutting food into pieces has at least one of the aforementioned characteristics.

In accordance with one advantageous embodiment, the storage compartment is mounted in a removable fashion to a motor casing, the drive mechanism is part of the motor casing, and the storage compartment has a transmission mechanism which works with the drive mechanism when the storage compartment is mounted on the motor casing, and the transmission mechanism allows the tool for cutting food into pieces to be placed in the storage compartment.

BRIEF DESCRIPTION OF THE DRAWINGS

The invention will be better understood by examining an example of embodiment, which is in no manner limitative, shown in the attached figures, in which.

DETAILED DESCRIPTION OF THE INVENTION

Figure 1:
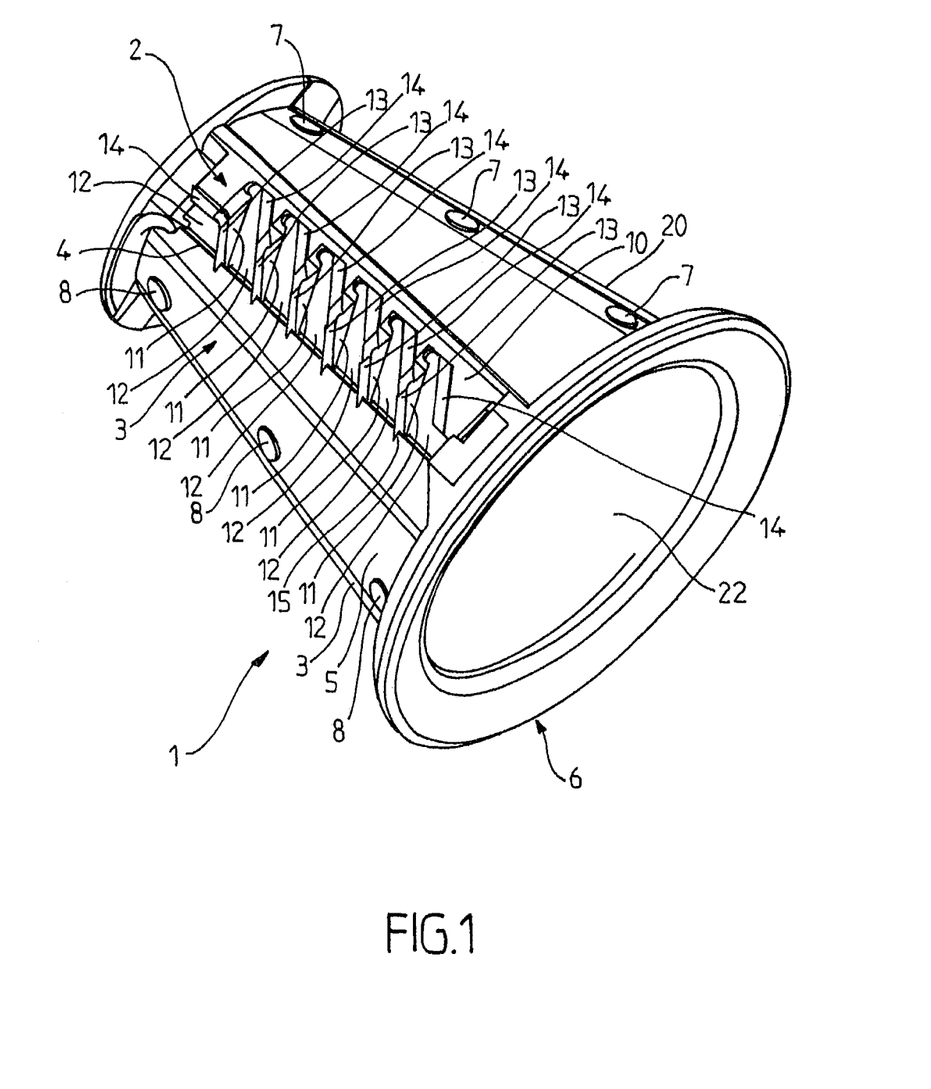
FIG. 1 is a side view of an example of embodiment of a tool for cutting food into pieces in accordance with the invention.

The tool for cutting food into pieces 1 shown in FIG. 1 is in the shape of a truncated cone and designed to be rotated. However, the invention is not limited to cutting tools in the shape of a truncated cone, but also covers fixed cutting tools, cutting tools which move back and forth, and cutting tools which rotate and which are cylindrical or circular.

The tool for cutting food into pieces 1 shown in FIG. 1 contains at least one cutting element 2 adjacent to support surface 3. Support surface 3 is designed to allow movement of the food item to be cut relative to cutting element 2. Retention body 4 is attached to support surface 3.

Cutting element 2 includes transverse wall 10 which extends along the support surface. Cutting element 2 includes at least one mount 11 which projects from transverse wall 10. Said mount 11 contains two passages for cut food 12 with transverse wall 10 and support surface 3. To this end, said mount 11 forms longitudinal cutting body 13 designed to split the food to be cut, and transverse wall 10 has on either said of said mount 11 two transverse cutting bodies 14 designed to detach the pieces of food split.

In the example of embodiment shown in FIG. 1, retention body 4 forms part of support element 5 which forms at least a portion of support surface 3. Cutting element 2 is attached to tool body 6. Tool body 6 forms at least a portion of support surface 3. Tool body 6 is advantageously made of plastic.

More in particular, cutting element 2 is attached to tool body 6 with rivets 7. Retention body 4 is attached to tool body 6. More in particular, retention body 4 is attached to tool body 6 with rivets 8.

Tool for cutting food into pieces 1 includes truncated cone wall 20 which is part of tool body 6. Cutting element 2 is attached outside truncated cone wall 20.

Figure 2:
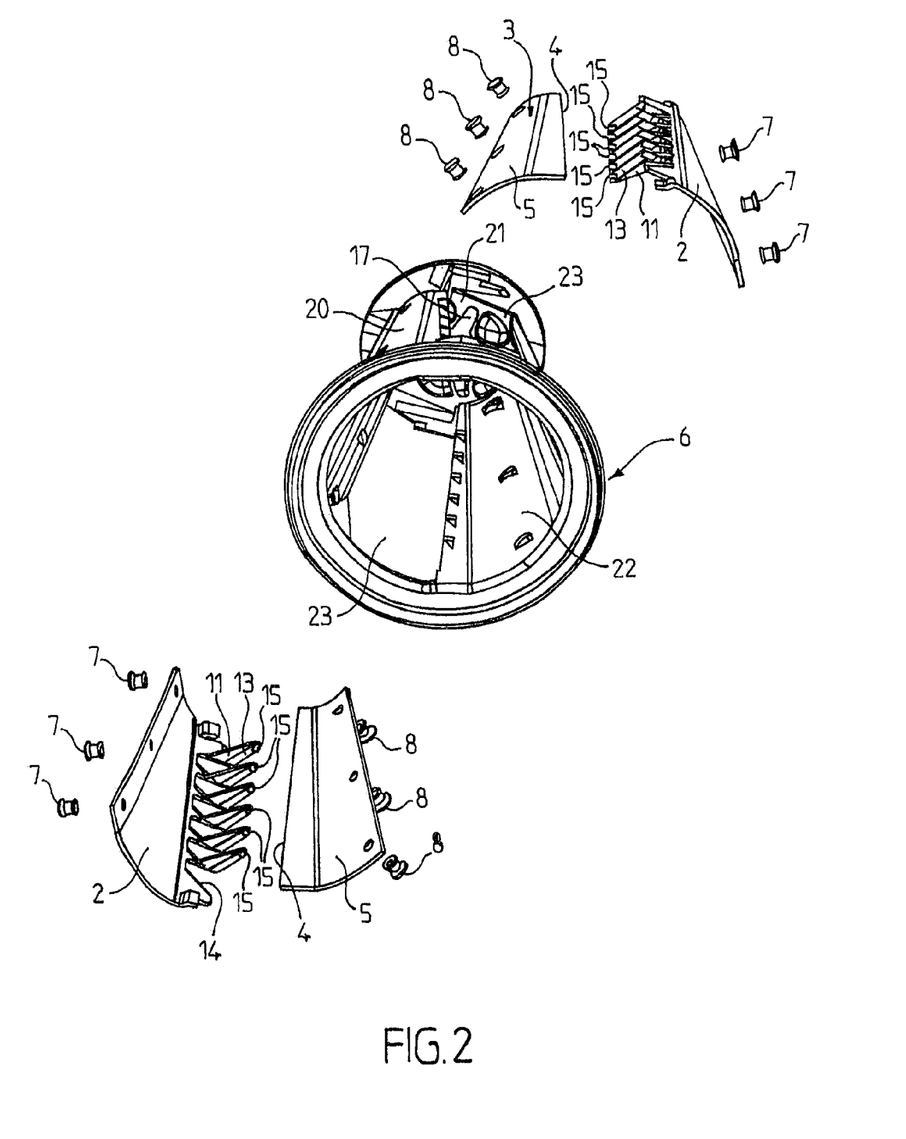
FIG. 2 is an exploded side view of the tool for cutting food into pieces shown in FIG. 1.

Cutting element 2 shown in Figures includes six mounts 11 of transverse wall 10. Six mounts 11 have seven passages for cut food 12. Transverse wall 10 contains seven transverse cutting bodies 14. Accordingly, two adjacent mounts 11 are separated by transverse cutting body 14.

As better seen in FIG. 2, each mount 11 has frontal notch 15. Retention body 4 attached to support surface 3 is engaged with frontal notch 15 of each mount 11. If desired, frontal notches 15 may be used to lightly tighten retention body 4.

Accordingly, cutting element 2 includes at least two mounts 11 which each have frontal notch 15 and retention body 4 engaged with frontal notches 15.

Longitudinal cutting body 13 of each mount 11 is located between transverse wall 10 and the notch 15. As shown in FIG. 1, retention body 4 is engaged with frontal notch 15 of each mount 11. The cutting width made by transverse cutting bodies 14 exceeds the cutting height of longitudinal cutting bodies 13. Frontal notches 15 are anchored to limit the deformation of transverse wall 10, in particular, at the level of the connections between mounts 11 and transverse wall 10.

As shown in FIG. 2, tool for cutting food into pieces 1 contains two cutting elements 2, each associated with retention body 4 belonging to support element 5. Tool body 6 has bottom wall 21 linked to truncated cone wall 20. Truncated cone wall 20 houses cut food exit opening 22. Truncated cone wall 20 has openings 23 which lead to passages for cut food 12. Truncated cone wall 20, cutting elements 2 and support elements 5 have perforations designed for installing rivets 7 and 8.

Tool for cutting food into pieces 1 contains rotation element 17. In the example of completion shown in the diagrams, rotation element 17 in included within tool body 6, more in particular in bottom wall 21. Rotation element 17 can, for example, be formed by an opening in a star shape centered in bottom wall 21.

If desired, longitudinal cutting bodies 13 may extend perpendicularly to the axis of rotation of tool for cutting food into pieces 1 and have a planar motion. Transverse cutting bodies 14 revolve around the axis of rotation of tool for cutting food into pieces 1. The movement of transverse cutting bodies 14 is a truncated cone or cylindrical and transverse cutting bodies 14 do not all necessarily have the same angle compared to the axis of rotation of tool for cutting food into pieces 1.

Figure 3:
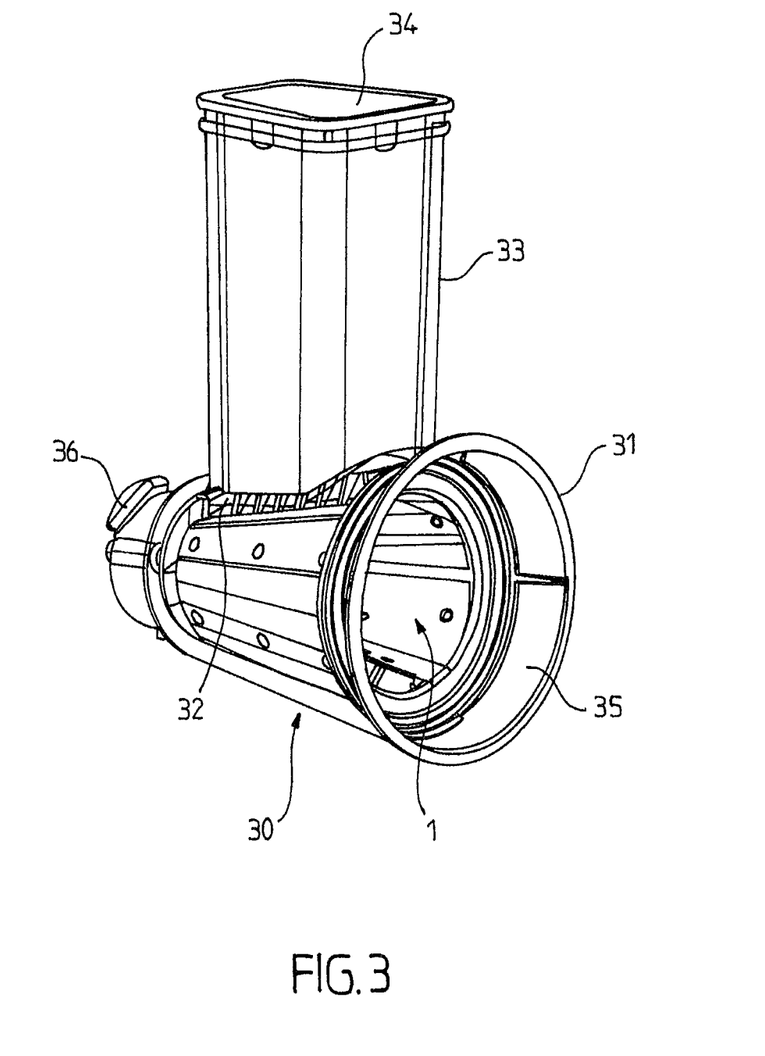
FIG. 3 is a side view of an example of embodiment of a food preparation accessory containing the tool for cutting food into pieces shown in FIGS. 1 and 2.

FIG. 3 shows food preparation accessory 30 designed to cut food into pieces.

Figure 4:
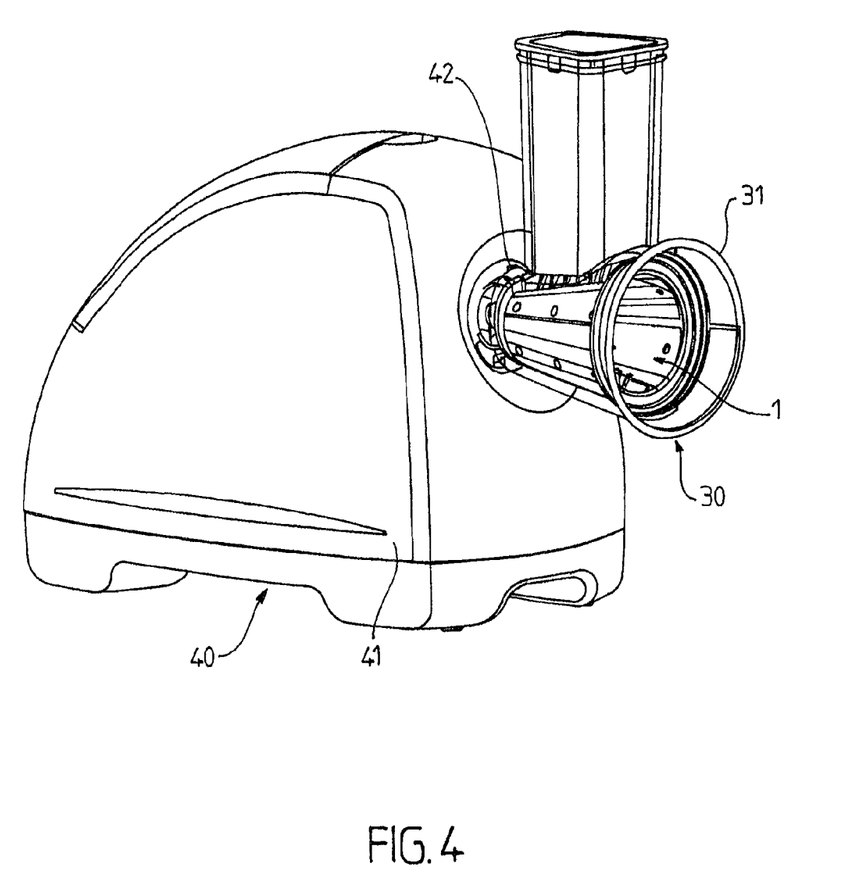
FIG. 4 is a side view of an example of embodiment of a food preparation device containing the food preparation accessory shown in FIG. 3.

FIG. 4 shows food preparation device 40 designed to cut food into pieces with food preparation accessory 30.

Food preparation accessory 30 includes storage compartment 31 which houses tool for cutting food into pieces 1 with at least one cutting element 2 including at least two passages for cut food 12 adjacent to support surface 3.

Storage compartment 31 shown in FIGS. 3 and 4 is preferably made of a transparent material.

As showed in FIG. 3, storage compartment 31 has food insertion opening 32 formed by spout 33. Spout 33 may accept pushing element 34. Food insertion opening 32 leads to support surface 3. Storage compartment 31 has cut food exit 35. Cut food exist 35 leads to passages for cut food 12.

As shown in FIG. 4, storage compartment 31 is mounted in a removable manner on motor casing 41. For this purpose, storage compartment 31 and motor casing 41 have hooking mechanisms 36 and 42, for example, bayonet-type fittings. Motor casing 41 contains an electrical motor which is electrically connected to command mechanisms and mechanically to the drive mechanism designed to drive the rotating portion of food preparation accessory 30, which is not shown in the diagrams. The drive mechanism is part of motor casing 41. Storage compartment 31 has transmission mechanisms, which are not shown in the diagrams, which work with the drive mechanism when storage compartment 31 is mounted on motor casing 41. The transmission mechanisms are designed to drive tool for cutting food into pieces 1 within storage compartment 31 using rotation element 17. The rotating portion of food preparation accessory 30 contains tool for cutting food into pieces 1 and the transmission mechanisms.

In a variation, storage compartment 31 could be integrated into motor casing 41. The transmission mechanisms are then no longer necessary as the drive mechanism can act directly on rotation element 17.

Therefore, food preparation device 40 contains a drive mechanism designed to move tool for cutting food into pieces 1 so that cutting element 2 sweeps food insertion opening 32, if desired by using transmission mechanisms.

Food preparation device 40, food preparation accessory 30 and tool for cutting food into pieces 1 operate and are used as follows.

The user insets a food item such as a potato into spout 33. The food item may come into contact with support surface 3 of tool for cutting food into pieces 1. Starting food preparation 40 device causes tool for cutting food into pieces 1 to rotate. The food item is blocked laterally with food insertion opening 32. Longitudinal cutting bodies 13 split the lower portion of the food item and transverse cutting bodies 14 detach the split portions of the remains of the food item. Retention body 4 inserted in frontal notches 15 prevents deformation of cutting element 2, thereby increasing the useful life of tool for cutting food into pieces 1.

In a variation, retention body 4 is not necessarily engaged with in all frontal notches 15. Several retention bodies 4 may be used if desired.

In a variation, all mounts 11 do not necessarily have frontal notch 15; at least one mount 11 must have frontal notch 15.

In a variation, tool for cutting food into pieces 1 may be cylindrical rather than in the shape of a truncated cone. The bottom wall is then surrounded by a cylindrical wall.

In a variation, tool for cutting food into pieces 1 is not necessarily in the shape of a truncated cone or cylindrical, but may, for example, be in the form of a disk in which transverse cutting bodies 14 move in a plane around the axis of rotation of tool for cutting food into pieces 1.

In a variation, tool for cutting food into pieces 1 does not necessarily rotate, but may, for example, move rectilinearly back and forth alternately like an electric slicer.

In a variation, tool for cutting food into pieces 1 is not necessarily driven, but may, for example, be part of a slicer-type device which includes a device to hold food which moves back and forth relative to the cutting element.

This invention is not in any manner limited to the examples of embodiment described and its variants, but encompasses many variations within the framework of the claims.

The invention claimed is:

1. A tool for cutting food into pieces, with at least one cutting element adjacent to a support surface designed for movement of the food item to be cut relative to the cutting element, where the cutting element contains a transverse wall which extends along the support surface, the cutting element includes at least one mount protruding from the transverse wall, with said at least one mount forming a longitudinal cutting body designed to split the food to be cut, and the transverse wall has two transverse cutting bodies designed to detach the pieces of food split, a first of said two transverse cutting bodies being on one side of said at least one mount and a second of said two transverse cutting bodies being on an opposite side of said at least one mount, and said at least one mount houses two passages for cut food with the transverse wall and the support surface, wherein a first of said two passages is defined by said at least one mount, said first of said two transverse cutting bodies said support surface, and, optionally, a second mount adjacent to said at least one mount on one side of said at least one mount, wherein a second of said two passages is defined by said at least one mount, said second of said two transverse cutting bodies, said support surface, and, optionally, a third mount adjacent to said at least one mount on the other side of said at least one mount, and wherein said at least one mount has a frontal notch, and the longitudinal cutting body is located between the transverse wall and the frontal notch, and a retention body is attached to the support surface which is engaged in the frontal notch.

2. The tool for cutting food into pieces in accordance with claim 1 in which the retention body is part of a support element which forms at least a portion of the support surface.

3. The tool for cutting food into pieces in accordance with claim 1 in which the cutting element is attached to a tool body.

4. The tool for cutting food into pieces in accordance with claim 3 in which the cutting element is attached to the tool body with rivets.

5. The tool for cutting food into pieces in accordance with claim 3 in which the retention body is attached to the tool body.

6. The tool for cutting food into pieces in accordance with claim 5 in which the retention body is attached to the tool body with rivets.

7. The tool for cutting food into pieces in accordance with claim 3 in which the tool body forms at least part of the support surface.

8. The tool for cutting food into pieces in accordance with claim 3 in which the tool body is made of plastic.

9. The tool for cutting food into pieces in accordance with claim 3 which contains a rotation element.

10. The tool for cutting food into pieces in accordance with claim 9 in which the rotation element is located within the tool body.

11. The tool for cutting food into pieces in accordance with claim 9 which has one of a truncated cone or cylindrical wall surrounding a bottom wall with rotation element and wherein the cutting element is located outside the truncated cone or cylindrical wall.

12. The tool for cutting food into pieces in accordance with claim 1 in which the cutting element includes at least two mounts which each have a frontal notch, wherein the retention body is engaged with the frontal notch of each of the at least two mounts.

13. A food preparation accessory designed to cut food into piece, comprising a storage compartment housing the tool for cutting food into pieces according to claim 1, where the storage compartment has a food insertion opening which leads to the support surface and a cut food exit connecting to the passages for cut food.

14. A food preparation device designed to cut food into pieces comprising a storage compartment housing the tool for cutting food into pieces according to claim 1, where the storage compartment has a food insertion opening which leads to the support surface and a cut food exit connecting to passages for the cut food, where a device with a drive mechanism designed to move the tool for cutting food into pieces so that the cutting element sweeps the food insertion opening, if desired using transmission mechanisms.

15. The food preparation device in accordance with claim 14 in which the storage compartment is mounted in a removable manner on a motor casing where the drive mechanism is part of the motor casing, the storage compartment has transmission mechanisms which work with the drive mechanism when the storage compartment is mounted on motor casing and the transmission mechanisms are designed to move the tool for cutting food into pieces into the storage compartment.

* * * * *

UNITED STATES PATENT AND TRADEMARK OFFICE
CERTIFICATE OF CORRECTION

PATENT NO. : 9,655,475 B2  
APPLICATION NO. : 14/122941  
DATED : May 23, 2017  
INVENTOR(S) : Jean-Luc Bordes et al.

Page 1 of 1

It is certified that error appears in the above-identified patent and that said Letters Patent is hereby corrected as shown below:

Column 7, Line 2, Claim 13, delete "piece," and insert -- pieces --

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*